United States Patent
Kang

(10) Patent No.: US 9,330,442 B2
(45) Date of Patent: May 3, 2016

(54) METHOD OF REDUCING NOISE IN IMAGE AND IMAGE PROCESSING APPARATUS USING THE SAME

(71) Applicant: Samsung Electronics Co., Ltd., Suwon-Si, Gyeonggi-Do (KR)

(72) Inventor: Byongmin Kang, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/501,235

(22) Filed: Sep. 30, 2014

(65) Prior Publication Data

US 2015/0093041 A1    Apr. 2, 2015

(30) Foreign Application Priority Data

Sep. 30, 2013   (KR) ........................ 10-2013-0116896

(51) Int. Cl.
    *G06T 5/00*   (2006.01)

(52) U.S. Cl.
    CPC ............. *G06T 5/002* (2013.01); *G06T 2200/04* (2013.01)

(58) Field of Classification Search
    CPC ............... G06T 5/002; G06T 2207/20012; G06T 2207/20032; G06T 5/20; G06K 9/40; H04N 5/357
    See application file for complete search history.

(56) References Cited

U.S. PATENT DOCUMENTS

| | | | |
|---|---|---|---|
| 8,139,891 B2 | 3/2012 | Chang et al. | |
| 2004/0126033 A1* | 7/2004 | Ishizaka | 382/254 |
| 2007/0196031 A1* | 8/2007 | Chen et al. | 382/278 |
| 2009/0161982 A1* | 6/2009 | Tico et al. | 382/275 |
| 2010/0020341 A1* | 1/2010 | Enjuji | 358/1.9 |
| 2010/0141804 A1* | 6/2010 | Morel et al. | 348/241 |
| 2011/0097008 A1* | 4/2011 | Cao et al. | 382/260 |
| 2011/0142368 A1* | 6/2011 | Shin et al. | 382/275 |
| 2011/0229029 A1 | 9/2011 | Kass | |
| 2012/0308104 A1 | 12/2012 | Yang et al. | |
| 2013/0314557 A1* | 11/2013 | Furukawa | 348/208.1 |
| 2014/0118578 A1* | 5/2014 | Sasaki et al. | 348/241 |
| 2014/0118581 A1* | 5/2014 | Sasaki et al. | 348/242 |
| 2014/0193082 A1* | 7/2014 | Ohnuki et al. | 382/205 |
| 2014/0218571 A1* | 8/2014 | Cheng | 348/273 |
| 2015/0187053 A1* | 7/2015 | Chen et al. | |

FOREIGN PATENT DOCUMENTS

| | | |
|---|---|---|
| KR | 1019970701897 B1 | 2/1997 |
| KR | 1020120017521 A | 2/2012 |

* cited by examiner

*Primary Examiner* — Jingge Wu
(74) *Attorney, Agent, or Firm* — Harness, Dickey & Pierce, P.L.C.

(57) ABSTRACT

Provided are methods and apparatuses for reducing noise in an image, in which a kernel that gives a weight to a pixel value with respect to determination of a similarity between patches is adaptively changed according to a reference patch, a non-transitory computer-readable storage medium for recording the same, and an image processing apparatus using the same, in which noise in an image is removed according to a noise removal algorithm based on non-local means.

18 Claims, 6 Drawing Sheets

METHOD OF REDUCING NOISE IN IMAGE AND IMAGE PROCESSING APPARATUS USING THE SAME

RELATED APPLICATIONS

This application claims the benefit of Korean Patent Application No. 10-2013-0116896, filed on Sep. 30, 2013, in the Korean Intellectual Property Office, the entire disclosure of which is incorporated herein in its entirety by reference.

BACKGROUND

1. Field

Example embodiments relate to methods and/or apparatuses for reducing noise in an image and/or an image processing apparatus using the same.

2. Description of the Related Art

Technology for manufacturing an image sensor that generates digital images with high resolution is advancing, and these advanced image sensors may be utilized in a camera module applied to a mobile apparatus such as a smartphone. As the resolution of the digital images increases, there is an increasing demand for a clear digital image. An image signal processor (ISP) semiconductor circuit, connected to an image sensor, may affect image quality. For example, the ISP semiconductor circuit may include a noise removal algorithm for reducing noise.

A noise removal algorithm that removes noises based on local means may allocate weights to pixel values pixel values by determining a similarity in the units of pixels. In contrast, a non-local means may allocate weight to pixel values by determining a similarity between local groups that consist of a plurality of pixels (a collection of pixels having a certain size of area with one pixel at a center, hereinafter, referred as a patch). Noise removal algorithm based on non-local means may produce crisp images compared to typical noise removal algorithms, and, therefore, may be employed in various fields in which digital images are used. The noise removal algorithm based on non-local means may also be employed for a depth image that is used to generate a three-dimensional (3D) image, as well as a general or medical image.

SUMMARY

Provided are methods and apparatuses for reducing noise in an image, in which a kernel that gives a weight to a pixel value with respect to determination of a similarity between patches is adaptively changed according to a reference patch, a non-transitory computer-readable storage medium for recording the same, and an image processing apparatus using the same, in which noise in an image is removed according to a noise removal algorithm based on non-local means.

Additional aspects will be set forth in part in the description which follows and, in part, will be apparent from the description, or may be learned by practice of the presented example embodiments.

According to some example embodiments, a method of reducing noise in an image includes: setting a reference patch that consists of a plurality of pixels, having a certain pixel included in the image as a center pixel, and target patches corresponding to the reference patch in the image; determining a similarity between the reference patch and the target patches; and removing noise from a center pixel in the reference patch based on pixel values of center pixels in the target patches, in consideration of a weight based on the similarity between the reference patch and the target patches, wherein a kernel for giving a weight to a pixel value with respect to the determining of the similarity between the reference patch and the target patches is adaptively changed according to the reference patch.

According to other example embodiments, a non-transitory computer-readable storage medium having stored thereon a computer program, which when executed by a computer, performs the method of reducing noise in an image.

According to other example embodiments, an image processing apparatus for reducing noise in an image includes: a patch setting unit for setting a reference patch that consists of a plurality of pixels, having a certain pixel included in the image as a center pixel, and target patches corresponding to the reference patch in the image; a similarity determination unit for determining a similarity between the reference patch and the target patches; and a noise removal unit for removing noise from a center pixel in the reference patch based on pixel values of center pixels in the target patches, in consideration of a weight based on the similarity between the reference patch and the target patches, wherein a kernel for giving a weight to a pixel value with respect to the determining of the similarity between the reference patch and the target patches is adaptively changed according to the reference patch.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
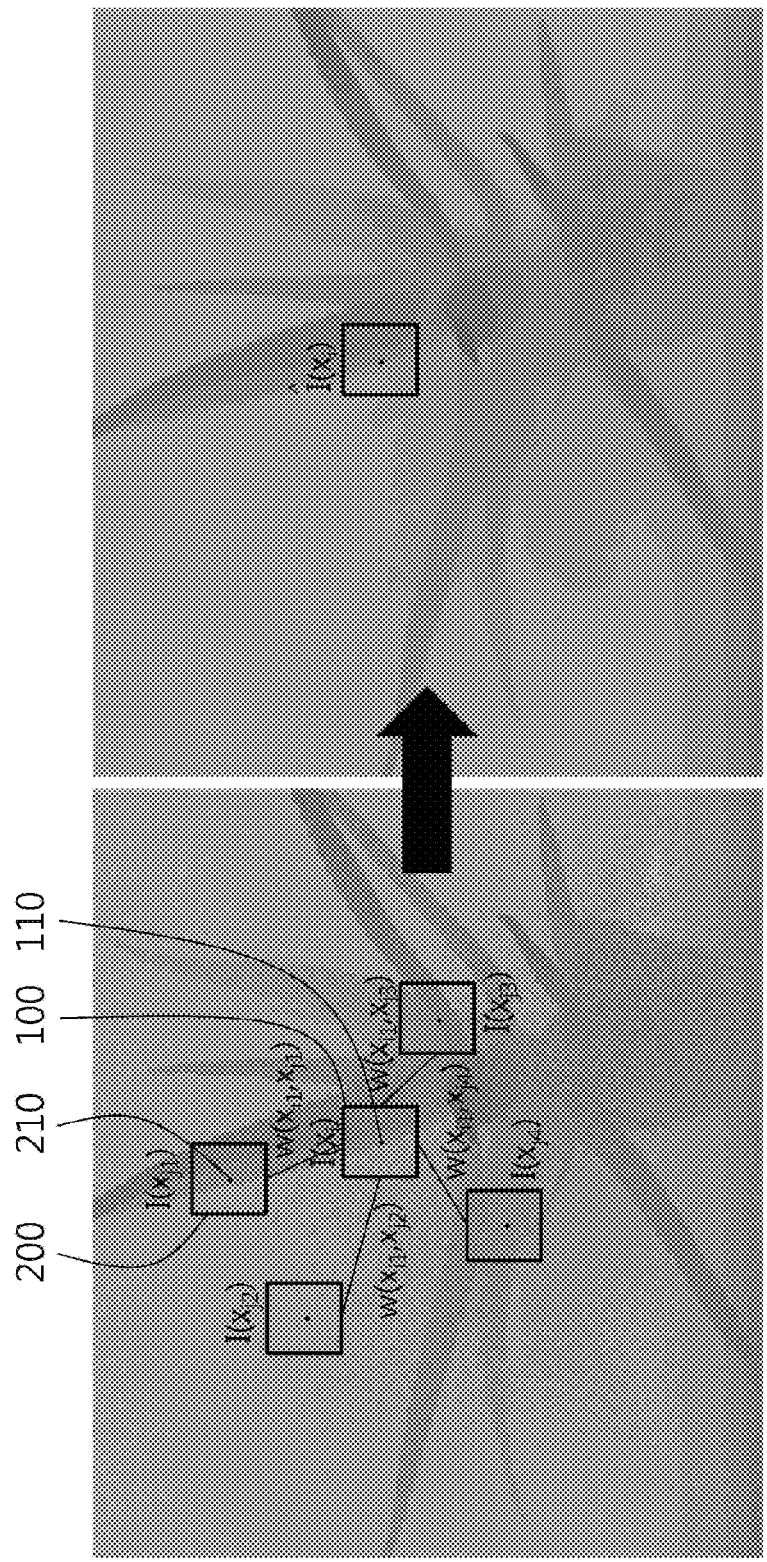
FIG. 1 is a diagram for explaining a method of reducing noise according to a noise reduction algorithm based on non-local means.

Reference will now be made in detail to example embodiments, some examples of which are illustrated in the accompanying drawings, wherein like reference numerals refer to like elements throughout. In this regard, the example embodiments may have different forms and should not be construed as being limited to the descriptions set forth herein. Rather, these example embodiments are provided so that this disclosure will be thorough and complete, and will fully convey the scope of example embodiments to those of ordinary skilled in the art. Accordingly, the example embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Some example embodiments relate to a method of reducing noise in an image and an image processing apparatus using the same, and descriptions of techniques or structures related to the described example embodiments which would be obvious to one of ordinary skill in the art may be omitted.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of this disclosure. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of this disclosure. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

FIG. 1 is a diagram for explaining a method of reducing noise according to a noise reduction algorithm based on non-local means. A left image shown in FIG. 1 is an image obtained before noise is removed, and a right image shown in FIG. 1 is a noise-removed image.

Below is described a method of reducing noise according to the noise removal algorithm based on non-local means according to some example embodiments.

Referring to FIG. 1, a reference patch 100 is set. The reference patch may consist of a plurality of pixels including a center pixel 110 that may have noise therein. Target patches 200 that correspond to the reference patch 100 may be set, and the pixel values of pixels in the target patches 200 may be used to remove noise that is present in the center pixel 110 of the reference patch 100. For example, center pixels 210 in the target patches 200 may be used to remove noise that is present in the center pixel 110 in the reference patch 100. When pixel values of the respective center pixels 210 in the target patches 200 are used to remove noise in the center pixel 110 in the reference patch 100, a weight may be given to each pixel value of the center pixels 210 in the target patches 200 so as to effectively remove noise.

With regard to the method of reducing noise according to the noise removal algorithm based on non-local means, a weight is given to the center pixels 210 based on a similarity between the reference patch 100 and the respective target patches 200. In other words, a weight that is given to a pixel value of the center pixels 210 in the target patches 200 varies with a degree of a similarity between the reference patch 100 and the target patches 200. The removal of the noise from the center pixel 110 in the reference patch 100 according to a noise removal algorithm based on non-local means may be expressed as Equation 1.

$$\bar{I}(x_i) = \frac{\sum_{x_j \in \Omega} w(x_i, x_j) I(x_j)}{\sum_{x_j \in \Omega} w(x_i, x_j)} \quad \text{Equation 1}$$

In Equation 1, $X_i$ may be a vector representing a location of a pixel, from which noise is to be removed, in an image, and represents the center pixel 110 in the reference patch 100 in the image. $I(X_i)$ may refer to a pixel value of the center pixel 110 in the reference patch 100. $X_j$ may be a vector representing a location of a nearby pixel, which is used to remove noise, in the image, and represents the center pixel 210 in the target patch 200 in the image. $I(X_j)$ may refer to a pixel value of the center pixel 210 in the target patch 200. $I(X_i)$ may refer to a pixel value of a pixel on which noise removal is performed, and refers to a pixel value of the center pixel 110 in the reference patch 100 after noise is removed. $\Omega$ may be a collection of all pixels in the image which are used to remove noise, and is a collection of all pixels that may be the center pixel 210 in the target patch 200 in the image. $W(X_i, X_j)$ is a weighting function with respect to the center pixel 210 in the target patch 200 for obtaining a weighted average when noise is removed from the center pixel 110 in the reference patch 100.

Referring to the left image shown in FIG. 1, the reference patch 100 and the center pixel 110 in the reference patch 100 are shown, and the target patches 200 are set near the reference patch 100. The target patch 200, shown in FIG. 1, only represents examples of the target patches 200 that are used to remove noise.

Additionally, the center pixels 210 in the target patches 200 respectively have a weight value with respect to the center pixel 110 in the reference patch 100. The right image, shown in FIG. 1, is a noise-removed image and shows that noise is removed and an edge is preserved, compared to the left image, shown in FIG. 1, which is obtained before noise is removed.

The weighing function $W(X_i, X_j)$ of Equation 1 may be expressed as Equation 2 shown below.

$$w(x_i, x_j) \exp\left(-\frac{s(x_i, x_j)}{\sigma^2}\right) \quad \text{Equation 2}$$

In Equation 2, $S(X_i, X_j)$ represents a similarity between the reference patch 100 having $X_i$ as the center pixel 110 and the target patch 200 having $X_j$ as the center pixel 210. $\sigma$ is a decay control factor for adjusting a width of the weighing function $W(X_i, X_j)$.

According to the noise-removal algorithm based on non-local means, $S(X_i, X_j)$ may be calculated using Equation 3.

$$s(x_i, x_j) = \sum_{\Delta x \in N} h(\Delta x) \|I(x_i + \Delta x) - I(x_j + \Delta x)\|^2 \quad \text{Equation 3}$$

$\Delta x$ is a displacement vector that represents a location that is away from the center pixel 110 or 210. In other words, $X_i + \Delta x$ represents a pixel in a location that is away from a location of $X_i$ by $\Delta x$. N represents a size of a patch. A patch may have various sizes N such as 5×5, 11×11, 21×21, or so on.

Referring to $S(X_i, X_j)$ shown in Equation 3, a similarity between the reference patch 100 and the target patch 200 may be calculated by calculating a difference in pixel values between a certain pixel in the reference patch and a pixel corresponding to the certain pixel in the target patch 200 and summing values that are obtained by squaring the calculated difference, with respect to all pixels in the reference patch 100.

Accordingly, if the two patches are similar, $S(X_i, X_j)$ may have a small value, and if the two patches are not similar, $S(X_i, X_j)$ may have a large value. Referring back to Equation 2, the weighing function $W(X_i, X_j)$ with respect to the center pixel 210 in the target patch 200, may have a large value if the two patches are similar, and may have a small value if the two patches are not similar. Resultantly, the pixel value $I(X_j)$ of the center pixel 210 in the target patch 200 used to remove noise in an image, is given a weight according to a similarity between the target patch 200, having $X_j$ as the center pixel 210, and the reference patch 100. If the target patch 200 and the reference patch 100 are similar, a high weight may be given to the pixel value $I(X_j)$ of the center pixel 210 in the target patch 200.

Referring back to Equation 3, a function $h(\Delta x)$ is further used when a similarity between the reference patch 100 and the target patch 200 is calculated. The function $h(\Delta x)$ may be a kernel that gives a weight to a pixel value based on a similarity between the reference patch 100 and the target patch 200 such that a value of $h(\Delta x)$ changes according to $\Delta x$. Since nearby pixels generally have a similar pixel value, a higher weight may be given to nearby pixels. Therefore, the function $h(\Delta x)$ gives a high weight to a pixel value of the pixel if the pixel is near the center pixel 110 in the patch 110, and gives a low weight to a pixel value if the pixel is far from the center pixel 110 in the patch 110.

For example, the function $h(\Delta x)$ may be a Gaussian kernel, and, therefore, $h(\Delta x)$ may be expressed as Equation 4 shown below.

$$h(\Delta x) = \exp\left(-\frac{\Delta x^2}{\gamma}\right) \quad \text{Equation 4}$$

$\gamma$ is a constant for adjusting a width of the kernel $h(\Delta x)$. Hereinafter, referring to FIG. 2, the kernel $h(\Delta x)$ is described in detail.

Figure 2:
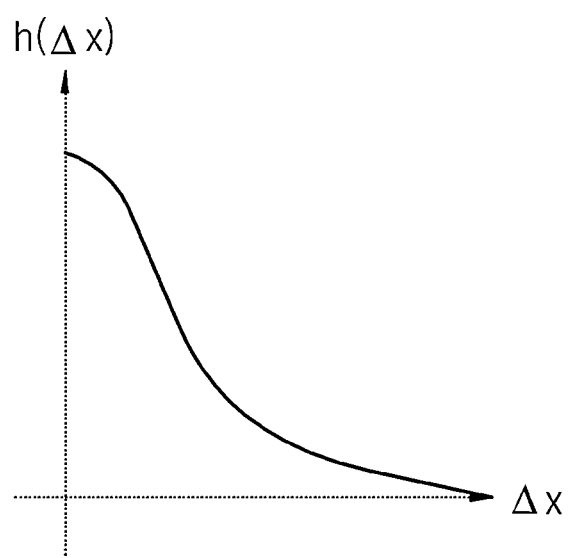
FIG. 2 is a diagram for explaining a kernel for giving a weight to a pixel value when a similarity between patches is calculated by using the noise removal algorithm based on non-local means.

FIG. 2 is a diagram for explaining a kernel for giving a weight to a pixel value when a similarity between patches is calculated by using the noise removal algorithm based on non-local means.

Referring to FIG. 2, the kernel $h(\Delta x)$, shown in FIG. 2, is a function in which a value changes according to $\Delta x$. If a value of $\Delta x$ is high, a value of $h(\Delta x)$ may be small. Accordingly, when a similarity between the reference patch 100 and the target patch 200 is calculated, a high weight is given to a pixel value if a value of $\Delta x$ is small.

In other words, the kernel $h(\Delta x)$ is a weighting function whose effectiveness depends on the assumption that nearby pixels have a similar pixel value. If such an assumption is not satisfied, a weight that is given to a pixel value by using the kernel $h(\Delta x)$ may be limited in its ability to effectively remove noise.

Hereinafter, referring to FIGS. 3 and 4, a problem of the typical kernel for giving a weight to a pixel value when a similarity between patches is calculated according to the noise removal algorithm based on non-local means is described.

Figure 3:
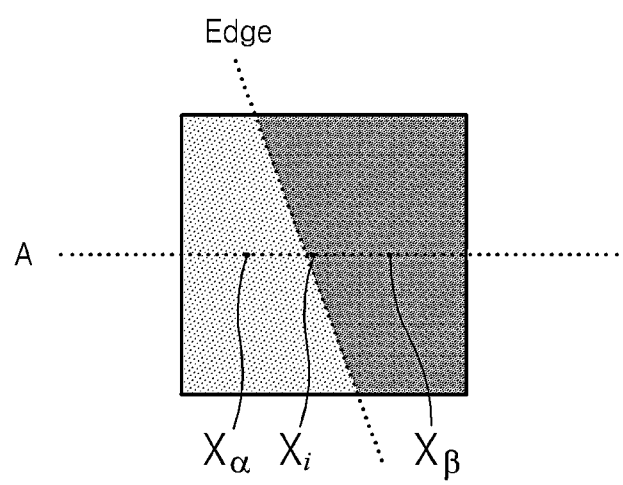
FIG. 3 is a diagram for explaining a pixel value of nearby pixels that are differentiated from the center pixel in a reference patch by using an edge as a boundary.

FIG. 3 is a diagram for explaining a pixel value of nearby pixels that are differentiated from the center pixel 110 in the reference patch 100 by using an edge as a boundary.

FIG. 3 shows an image in which a part of the reference patch 100 in the left image, shown in FIG. 1, is expanded. Referring to FIG. 3, pixel values of two parts which are divided by an edge in the reference patch 100 are different from each other. The center pixel 110 is included in a right part from among the both parts that are divided by the edge.

Referring to FIG. 3, a line A passing through the center pixel 110 in the reference patch 100 is set, and a line of pixels that include the center pixel 110 $X_i$, included in the line A, may be identified. A pixel $X_\alpha$ and a pixel $X_\beta$, which are on the line A equidistant from the center pixel 110 $X_i$, are shown in FIG. 3. With reference to the edge, the pixel $X_\alpha$ is located in a left part with respect to the edge, and the pixel $X_\beta$ is located in a right part with respect to the edge. In other words, the pixel $X_\alpha$ and the pixel $X_\beta$ are away from the center pixel 110 $X_i$ at a same distance, but since the edge is present between the pixel $X_\alpha$ and the pixel $X_\beta$, the pixel $X_\alpha$ and the pixel $X_\beta$ are separate in the left part and the right part with respect to the edge.

Since the edge corresponds to a boundary for dividing areas having different pixel values from each other, pixel values of the areas divided by the edge may be different from each other. As shown in FIG. 3, since the center pixel 110 $X_i$ and the pixel $X_\beta$ are in the right part with respect to the edge, the center pixel 110 $X_i$ and the pixel $X_\beta$ may have similar pixel values. However, the pixel $X_\alpha$ is in the left part with respect to the edge, the pixel $X_\alpha$ may have a pixel value that is different from pixel values of the center pixel 110 $X_i$ and the pixel $X_\beta$.

However, even though the pixel $X_\alpha$ may have a different pixel value, when utilizing the kernel $h(\Delta x)$ described with reference to FIG. 2, since the pixel $X_\alpha$ and the pixel $X_\beta$ are away from the center pixel 110 at a same distance, the pixel $X_\alpha$ and the pixel $X_\beta$ may be given a same weight. This potential problem is described in detail with reference to FIG. 4.

Figure 4:
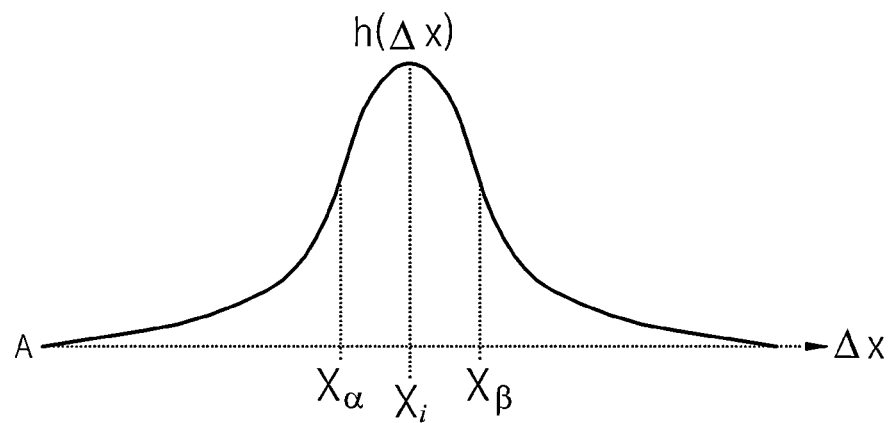
FIG. 4 is a diagram for explaining a limit in a typical kernel for giving a weight to a pixel value when a similarity between patches is calculated by using the noise removal algorithm based on non-local means.

FIG. 4 is a diagram for explaining a limit in a typical kernel for giving a weight to a pixel value when a similarity between patches is calculated by using the noise removal algorithm based on non-local means.

Referring to FIG. 4, the typical kernel $h(\Delta x)$, shown in FIG. 4, is a symmetrical version of the typical kernel $h(\Delta x)$ shown in FIG. 2. In other words, for the same values of locations $\Delta x$ away from the center pixel 110, a value of $h(\Delta x)$ may also be the same. The pixel $X_\alpha$ and the pixel $X_\beta$ that are on the line A at a same distance away from the center pixel 110 $X_i$, described with reference to FIG. 3, have the same $h(\Delta x)$ value as shown in FIG. 4, and thus, a same weight is given to the pixel $X_\alpha$ and the pixel $X_\beta$.

However, as described with reference to FIG. 3, since an edge in which pixel values vary may be present between the pixel $X_\alpha$ and the pixel $X_\beta$, pixel values of the pixel $X_\alpha$ and the pixel $X_\beta$ may have a great difference from each other. Accordingly, since only a location away from the center pixel 110 $X_i$ is taken into account in the typical kernel $h(\Delta x)$, the typical kernel $h(\Delta x)$ may not accurately remove noise.

Figure 5:
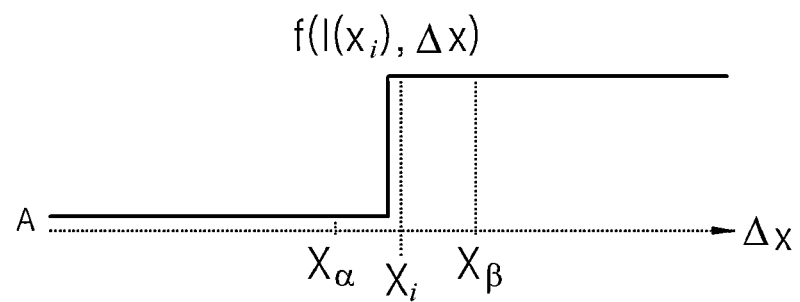
FIG. 5 is a diagram for explaining a weight according to a similarity between pixel values of the center pixel and nearby pixels in the reference patch, which is applied to the kernel with regard to the method of reducing noise according to the noise reduction algorithm based on non-local means, according to some example embodiments.

FIG. 5 is a diagram for explaining a weight according to a similarity between pixel values of the center pixel 110 and periphery pixels in the reference patch 100, which is applied to the kernel with regard to the method of reducing noise according the noise reduction algorithm based on non-local means, according to some example embodiments.

Referring to FIG. 5, according to some example embodiments, with regard to the method of reducing noise according to the noise reduction algorithm based on non-local means, a kernel is designed to further take into account a similarity between pixel values of the center pixel 110 and nearby pixels in the reference patch 100, so as to overcome the limit in the typical kernel that is described above.

For example, a weighting function $F(I(X_i), \Delta x)$, which varies according to a similarity between a pixel value of the center pixel 110 $X_i$ and a pixel value of a nearby pixel in the reference patch 100, is further included.

Referring back to the image of the reference patch 100 described above with reference to FIG. 3. In the image of the reference patch 100, the pixel $X_\alpha$, the center pixel 110 $X_i$, and the pixel $X_\beta$ are on the line A that passes through the center pixel 110 $X_i$. As illustrated in FIG. 3, the edge in which pixel values vary may be present between the pixel $X_\alpha$ and the center pixel 110 $X_i$. For convenience of description, it is assumed that all pixels in a left area with respect to the edge have a pixel value of 'a', and all pixels in a right area with respect to the edge have a pixel value of 'b', however, example embodiments are not limited thereto. Thus, a pixel value of the pixel $X_\alpha$ is 'a', and the pixel value of the pixel $X_\beta$ and of the center pixel 110 $X_i$ is 'b'. Accordingly, a pixel value of the pixel $X_\alpha$ has a difference of 'b−a' from a pixel value of the center pixel 110 $X_i$, and a pixel value of $X_\beta$ has no difference from a pixel value of the center pixel 110 $X_i$.

Based on such a similarity between pixel values, the weighting function $F(I(X_i), \Delta x)$ shown in FIG. 5, which varies according to a similarity between a pixel value of the center pixel 110 $X_i$, may be employed. Referring to FIG. 5, since an edge is present in a left part with respect to the center pixel 110 $X_i$, weights of pixels, which are divided into both parts with respect to a pixel on a line A included in the edge, are different from each other.

In other words, according to the weight function $f(I(X_i), \Delta x)$ based on a similarity between pixel values, pixels in a same area as the center pixel 110 $X_i$ in the right part with respect to the edge have a high weight, and pixels in a different area from the center pixel 110 $X_i$ in the left part with respect to the edge have a low weight.

Hereinafter, a kernel used in the method of reducing noise in an image according to the noise reduction algorithm based on non-local means and designed by further taking into account a similarity between pixel values is described.

Figure 6:
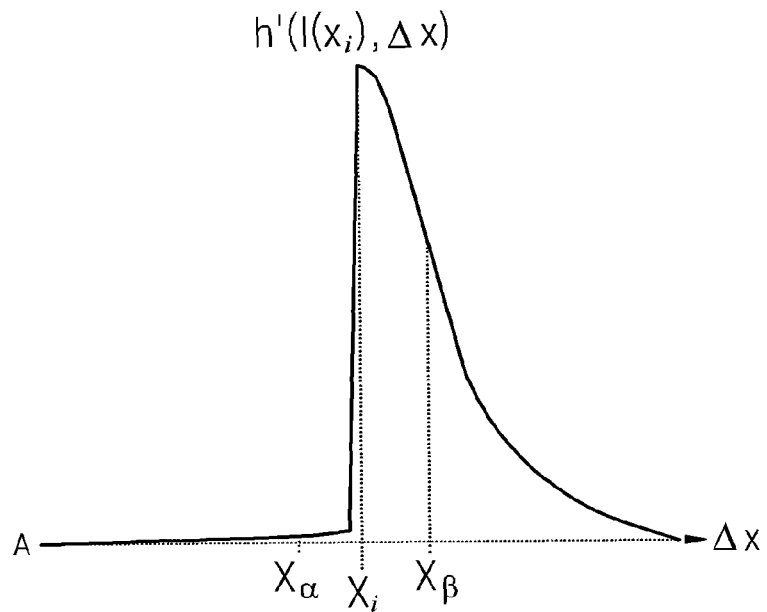
FIG. 6 is a diagram of a kernel used in the method of reducing noise in an image according to the noise reduction algorithm based on non-local means, according to some example embodiments.

FIG. 6 is a diagram of a kernel used in the method of reducing noise in an image according to a noise reduction algorithm based on non-local means, according to some example embodiments.

Referring to FIG. 6, a kernel $h'(I(X_i), \Delta x)$, shown in FIG. 6, represents a kernel used with regard to the image of the reference patch 100 described with reference to FIGS. 3 and 5, according to some example embodiments.

With regard to the kernel h'(I(X$_i$), Δx), the weight f(I(X$_i$), Δx) according to a similarity between pixel values is further taken into account, compared to the typical kernel h(Δx). Resultantly, the kernel h'(I(X$_i$), Δx) may be generated by multiplying the function described with reference to FIG. 4 by the function described with reference to FIG. 5. According to the kernel h'(I(X$_i$), Δx), even when pixels are at a same distance away from the center pixel 110 X$_i$, a different weight may be given to the pixels according to a pixel value. Therefore, a greater weight may be given to the pixel X$_\beta$ and less weight may be given to the pixel X$_\alpha$ as compared to when the typical kernel h(Δx) described with reference to FIG. 4 is employed. According to some example embodiments, the kernel h'(I(X$_i$), Δx) employed in the method of reducing noise in an image according to the noise removal algorithm based on non-local means may be expressed as Equation 5 shown below.

$$h'(I(x_i), \Delta x) = f(I(x_i), \Delta x) \cdot \exp\left(-\frac{\Delta x^2}{\gamma}\right) \quad \text{Equation 5}$$

In Equation 5, f(I(X$_i$), Δx) represents the weight according to the similarity between pixel values, and may be expressed as Equation 6 shown below.

$$f(I(x_i), \Delta x) = 1 - \frac{\|I(x_i) - I(x_i + \Delta x)\| - V_{min}}{V_{max} - V_{min}} \quad \text{Equation 6}$$

In Equation 6, V$_{max}$ represents a maximum value from among difference values between the center pixel 110 and a nearby pixel in the reference patch 100. V$_{min}$ represents a minimum value from among difference values between the center pixel 110 and a nearby pixel in the reference patch 100. V$_{max}$ and V$_{min}$ may be expressed by Equations 7 and 7, respectively, as shown below.

$$V_{max} = \max_{\Delta x \in N} \|I(x_i) - I(x_i + \Delta x)\| \quad \text{Equation 7}$$

$$V_{min} = \min_{\Delta x \in N} \|I(x_i) - I(x_i + \Delta x)\| \quad \text{Equation 8}$$

Accordingly, the kernel h'(I(X$_i$), Δx) employed in the method of reducing noise in an image according to the noise removal algorithm based on non-local means may be adaptively changed according to the reference patch 100 and may be adaptively changed according to a distribution of pixel values in the reference patch 100.

Additionally, as shown in Equation 5, the kernel h'(I(X$_i$), Δx) may be adaptively changed according to a similarity between the center pixel 110 in the reference patch 100 and nearby pixels in the reference patch 100. For example, the kernel h'(I(X$_i$), Δx) gives a high weight to a pixel value, if a similarity between the center pixel 110 in the reference patch 100 and nearby pixels in the reference patch 100 is high.

In other words, according to some example embodiments, the kernel h'(I(X$_i$), Δx) may be generated in consideration of both a similarity between the center pixel 110 in the reference patch 100 and nearby pixels in the reference patch 100 and a location difference between the center pixel 110 in the reference patch 100 and nearby pixels in the reference patch 100.

Additionally, as shown in Equation 6, the kernel h'(I(X$_i$), Δx) may be generated by taking into account difference values between the center pixel 110 in the reference patch 100 and nearby pixels in the reference patch 100 and employing a maximum value and a minimum value from among the difference values.

For example, the kernel h'(I(X$_i$), Δx) may be generated by using a value, which is obtained by normalizing difference values between the center pixel 110 in the reference patch 100 and nearby pixels in the reference patches 100 by using a maximum value and a minimum value from among the difference values therebetween. In other words, using Equation 6, a weight according to a similarity between the center pixel 110 in the reference patch 100 and nearby pixels in the reference patch 100 may be normalized to a value between 0 and 1.

Figure 7:
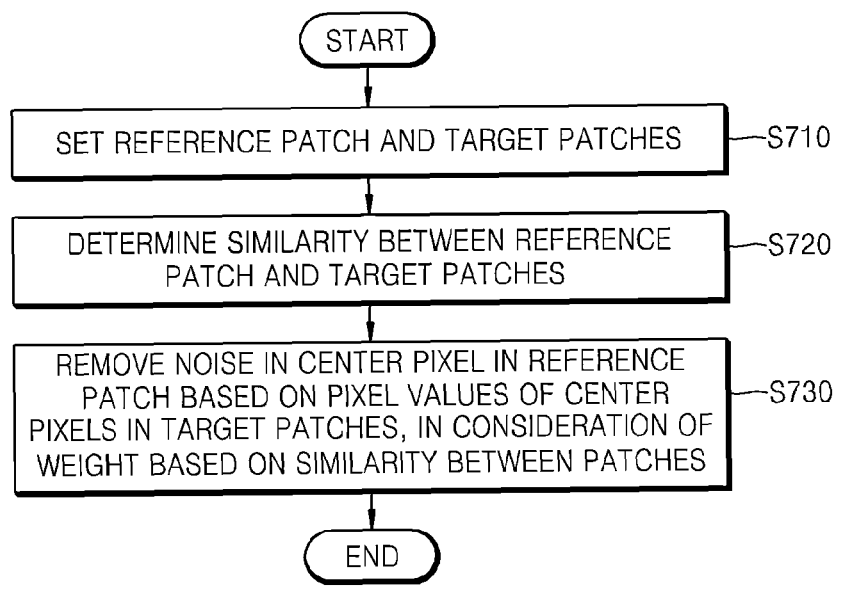
FIG. 7 is a flowchart of a method of reducing noise in an image according to the noise reduction algorithm based on non-local means, according to some example embodiments.

FIG. 7 is a flowchart of a method of reducing noise in an image according to the noise reduction algorithm based on non-local means, according to some example embodiments.

Referring to FIG. 7, in operation S710, the reference patch 100 that consists of a plurality of pixels, having a certain pixel included in an image as the center pixel 110, and target patches 200 that correspond to the reference patch 100 in the image are set. The reference patch 100 may be set respectively for all pixels included in the image. In other words, a reference patch having the pixel at a center may be set respectively according to a pixel from which noise is to be removed. Accordingly, a distribution of pixel values included in each of the reference patches may be changed each time according to a pixel from which noise is to be removed.

In operation S720, a similarity between the reference patch 100 and the target patches 200 is determined. When the similarity between the patches is determined, a kernel for providing a weight is employed. According to some example embodiments, a kernel may be adaptively changed according to the reference patch 100 and may be adaptively changed according to a distribution of each pixel value of the reference patch 100.

Additionally, according some example embodiments, a kernel may be adaptively changed according to a similarity between the center pixel 110 in the reference patch 100 and nearby pixels in the reference patch 100. For example, the kernel may give a high weight to pixel values, if a similarity between the center pixel 110 in the reference patch 100 and nearby pixels in the reference patch 100 is high. In other words, the kernel may be generated in consideration of both a similarity between the center pixel 110 in the reference patch 100 and nearby pixels in the reference patch 100 and a location difference between the center pixel 110 in the reference patch 100 and nearby pixels in the reference patch 100.

Additionally, according to some example embodiments, the kernel may be generated by taking into account difference values between the center pixel 110 in the reference patch 100 and nearby pixels in the reference patch 100 and using a maximum value and a minimum value from among the difference values. For example, the kernel may be generated by using a value, which is obtained by normalizing difference values between the center pixel 110 in the reference patch 100 and nearby pixels in the reference patches 100 by using a maximum value and a minimum value from among the difference values therebetween. In other words, a weight according to a similarity between the center pixel 110 in the reference patch 100 and nearby pixels in the reference patch 100 may be normalized to a value between 0 and 1.

In step 730, noise in the center pixel 110 in the reference patch 100 is removed based on pixel values of the center pixels 210 in the target patches 200, in consideration of a weight based on the similarity between the patches.

According to some example embodiments, with regard to the method of reducing noise in an image according to the noise reduction algorithm based on non-local means, noise may be removed by further employing an image adjacent to the image from which noise is to be removed. The noise may be removed in view of the adjacent image based on Equation 9, shown below.

$$\bar{I}(x_i^n) = \frac{\sum_{\Delta n} \sum_{x_j \in \Omega} w(x_i^n, x_j^{n+\Delta n}) I(x_j^{n+\Delta n})}{\sum_{\Delta n} \sum_{x_j \in \Omega} w(x_i^n, x_j^{n+\Delta n})} \qquad \text{Equation 9}$$

In Equation 9, n represents a frame number of a current image and $\Delta n$ represents a difference between the frame number n of the current image and a frame number of an adjacent image that will be further used to remove noise. In other words, if $\Delta n$ is −1, 0, and 1, images of a current frame, a previous frame, and a next frame are used to remove noise from the current frame.

Figure 8:
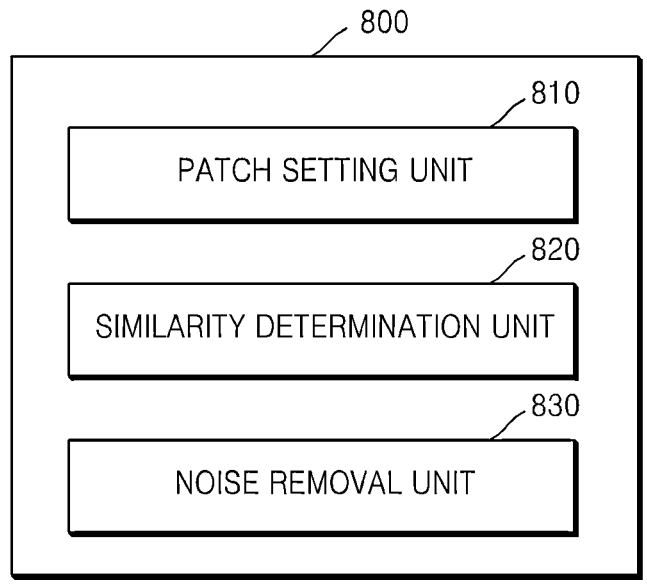
FIG. 8 is a block diagram of an image processing apparatus for reducing noise in an image according to a noise reduction algorithm based on non-local means, according to some example embodiments.

FIG. 8 is a block diagram of an image processing apparatus 800 for reducing noise in an image according to the noise reduction algorithm based on non-local means, according to an embodiment of the present disclosure. It may be understood by one of ordinary skill in the art that, in addition to elements shown in FIG. 8, other elements may be further included.

The method of reducing noise in an image according to the noise removal algorithm based on non-local means, as discussed above with reference to FIG. 7, may be performed by the image processing apparatus 800 according to some example embodiments.

Referring to FIG. 8, the image processing apparatus 800 for reducing noise in an image may include a processor and a memory (not shown).

The processor may be an arithmetic logic unit, a digital signal processor, a microcomputer, a field programmable array, a programmable logic unit, a microprocessor or any other device capable of responding to and executing instructions in a defined manner such that the processor is programmed with instructions that configure the processor as a special purpose computer to perform the operations illustrated in FIG. 7, such that the processor is configured to give weight to pixel values in consideration of both a similarity between the center pixel 110 in the reference patch 100 and nearby pixels in the reference patch 100 and a location difference between the center pixel 110 in the reference patch 100 and nearby pixels in the reference patch 100.

The patch setting unit 810 sets the reference patch 100 that consists of a plurality of pixels, having a certain pixel included in an image as a center pixel 110, and the target patches 200 that correspond to the reference patch 100 in the image. The reference patch 100 may be set respectively for all pixels included in an image. In other words, according to a pixel from which noise is to be removed, a respective reference patch 100 having the pixel at a center may be set. Accordingly, a distribution of pixel values included in the respective reference patch 100 may be changed each time according to a pixel from which noise is to be removed.

The image processing apparatus 800 may include a patch setting unit 810, a similarity determination unit 820, and a noise removal unit 830. For example, the processor may be configured to execute instructions that program the processor to perform the functions of one or more of the patch setting unit 810, the similarity determination unit 820, and the noise removal unit 830.

The similarity determination unit 820 determines a similarity between the reference patch 100 and the target patches 200. Hereinafter, referring to FIG. 9, the similarity determination unit 820 is described in detail.

Figure 9:
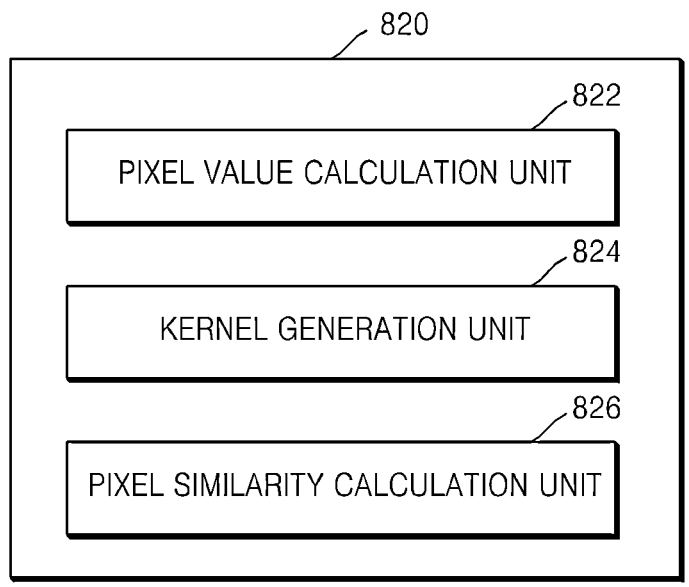
FIG. 9 is a detailed block diagram of a similarity determination unit that constitutes the image processing apparatus for reducing noise in an image according to the noise removal algorithm based on non-local means, according to some example embodiments.

FIG. 9 is a detailed block diagram of the similarity determination unit 820 that constitutes the image processing apparatus 800 for reducing noise in an image according to the noise removal algorithm based on non-local means, according to some example embodiments.

Referring to FIG. 9, the similarity determination unit 820 may include a pixel value calculation unit 822, a kernel generation unit 824, and a pixel similarity calculation unit 826.

The pixel value calculation unit 822 sums values that are obtained by calculating a difference in pixel values between a certain pixel in the reference patch 100 and a pixel corresponding to the certain pixel in the target patch 200 and squaring the calculated difference, with respect to all pixels in the reference patch 100, so as to determine a similarity between the reference patch 100 and the target patch 200.

The kernel generation unit 824 generates a kernel that gives a weight to a difference in pixel values between a certain pixel in the reference patch 100 and a pixel corresponding to the certain pixel in the target patch 200, calculated by the pixel value calculation unit 822. According to some example embodiments, the kernel generation unit 824 may adaptively change the kernel according to the reference patch 100 and may be adaptively change the kernel according to a distribution of each pixel value in the reference patch 100.

For example, the kernel generation unit 824 may adaptively change the kernel according to a similarity between the center pixel 110 in the reference patch 100 and nearby pixels in the reference patch 100. This is because a high weight is given to pixel values, if a similarity between the center pixel 110 in the reference patch 100 and nearby pixels in the reference patch 100 is high. The kernel generation unit 824 may generate the kernel in consideration of both a similarity between the center pixel 110 in the reference patch 100 and nearby pixels in the reference patch 100 and a location difference between the center pixel 110 in the reference patch 100 and nearby pixels in the reference patch 100.

According to some example embodiments, the kernel generation unit 824 may generate the kernel by taking into account difference values between the center pixel 110 in the reference patch 100 and nearby pixels in the reference patch 100 and using a maximum value and a minimum value from among the difference values. In detail, the kernel generation unit 824 may generate the kernel by using a value, which is obtained by normalizing difference values between the center pixel 110 in the reference patch 100 and nearby pixels in the reference patches 100 by using a maximum value and a minimum value from among the difference values therebetween. In other words, the kernel generation unit 824 may normalize a weight according to a similarity between the center pixel 110 in the reference patch 100 and nearby pixels in the reference patch 100 to a value between 0 and 1.

The pixel similarity calculation unit 826 calculates a similarity between pixels so that the kernel generation unit 824 generates a kernel. In other words, the pixel similarity calculation unit 826 may calculate a similarity between the center pixel 110 in the reference patch 100 and nearby pixels in the reference patch 100. For example, the pixel similarity calculation unit 826 may calculate a similarity between pixels by calculating a difference value between the center pixel 110 in the reference patch 100 and nearby pixels in the reference patch 100. The kernel generation unit 824 may use the difference value, calculated by the pixel similarity calculation unit 826, to generate the kernel.

Resultantly, when a similarity between the reference patch 100 and the target patch 200 is determined, the similarity determination unit 820 may use the kernel to give a weight to pixel values in consideration of both a similarity between the center pixel 110 in the reference patch 100 and nearby pixels in the reference patch 100 and a location difference between the center pixel 110 in the reference patch 100 and nearby pixels in the reference patch 100.

Referring back to FIG. 8, the noise removal unit 830 removes noise in the center pixel 110 in the reference patch 100 based on the pixel values of the center pixels 210 in the target patches 200, in consideration of the weight based on the similarity between patches.

According to some example embodiments, the image processing apparatus 800 for reducing noise in an image according to the noise removal algorithm based on non-local means may remove noise in a medical image or a depth image that shows a distance between an image photographing apparatus and a subject, as shown in FIG. 1, as well as in a general image.

Figure 10:
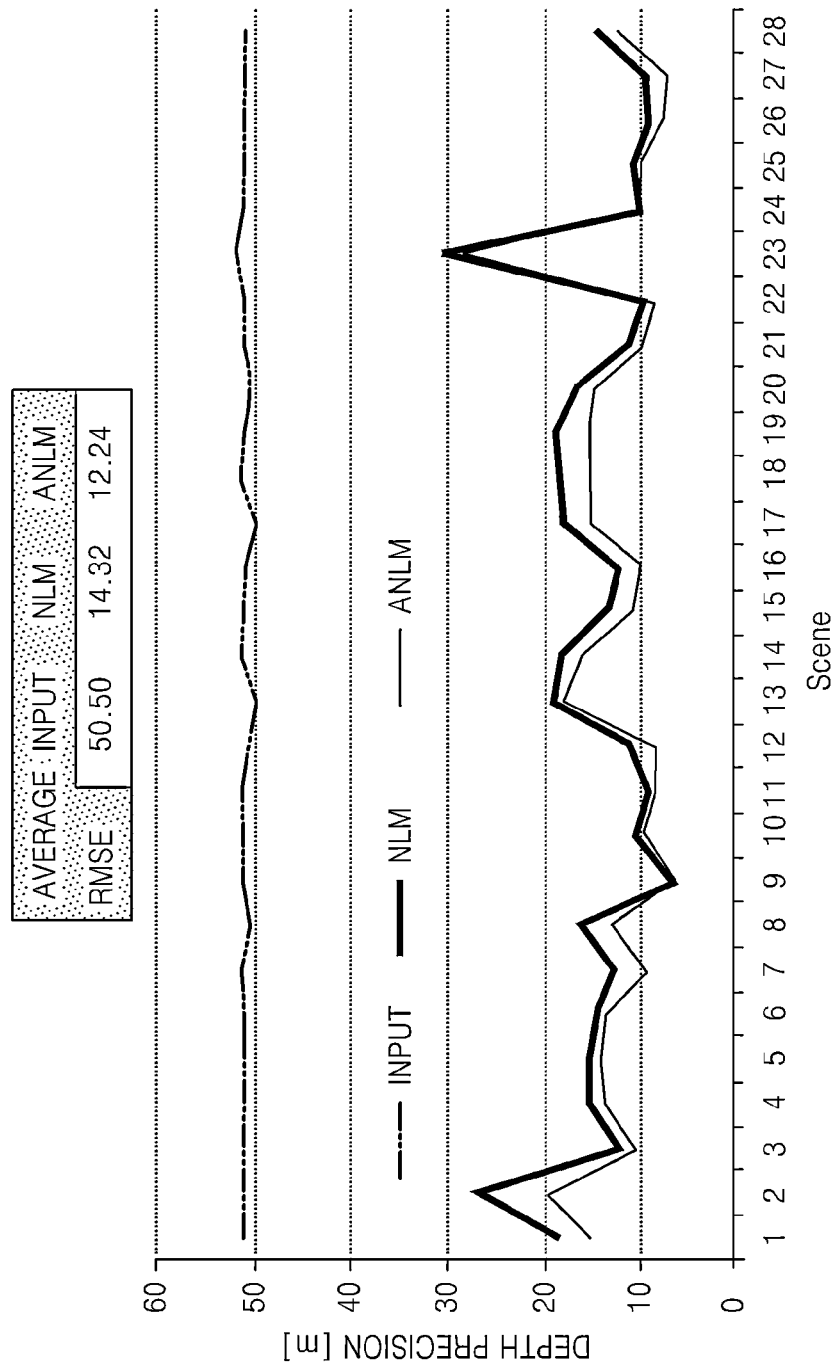
FIG. 10 is a graph showing performance when the method of reducing noise in an image according to the noise removal algorithm based on non-local means is performed according to some example embodiments.

FIG. 10 is a graph showing performance when the method of reducing noise in an image according to the noise removal algorithm based on non-local means is performed according to some example embodiments.

Referring to FIG. 10, an image that is input before noise is removed, is shown as INPUT, an image in which noise is reduced according to the typical noise removal algorithm based on non-local means, is shown as NLM in FIG. 10, and an image in which noise is reduced according to the noise removal algorithm based on non-local means according to some example embodiments, is shown as ANLM in FIG. 10. A root mean square error (RMSE) is employed to calculate an error in the images caused by noise.

As shown in FIG. 10, an RMSE value of the image ANLM in which noise is reduced according to the noise removal algorithm based on non-local means, according to some example embodiment, is smaller than an RMSE value of the image NLM in which noise is reduced according to the typical noise removal algorithm based on non-local means. Thus, the image processing apparatus 800, which utilizes the noise removal algorithm based on non-local means, according to some example embodiments, may have improved noise removal capabilities.

As described above, according to the one or more of the above example embodiments, an edge in an image is preserved and noise removal performance may be improved.

In addition, example embodiments can also be implemented through computer-readable code/instructions in/on a medium, e.g., a non-transitory computer-readable medium, to control at least one processing element to implement any above-described embodiment. The medium can correspond to any medium/media permitting the storage and/or transmission of the computer-readable code.

The computer-readable code can be recorded/transferred on a medium in a variety of ways, with examples of the medium including recording media, such as magnetic storage media (e.g., ROM, floppy disks, hard disks, etc.) and optical recording media (e.g., CD-ROMs, DVDs, etc.), and transmission media such as Internet transmission media. Thus, the medium may be such a defined and measurable structure including or carrying a signal or information, such as a device carrying a bitstream according to one or more embodiments of the present disclosure. The media may also be a distributed network, so that the computer-readable code is stored/transferred and executed in a distributed fashion. Furthermore, the processing element could include a processor or a computer processor, and processing elements may be distributed and/or included in a single device.

It should be understood that the example embodiments described therein should be considered in a descriptive sense only and not for purposes of limitation. Descriptions of features or aspects within each example embodiment should typically be considered as available for other similar features or aspects in other embodiments.

While one or more example embodiments have been described with reference to the figures, it will be understood by those of ordinary skill in the art that various changes in form and details may be made therein without departing from the spirit and scope of the example embodiments as defined by the following claims.

What is claimed is:

1. A method of reducing noise in an image, the method comprising:
setting a plurality of pixels in the image as a reference patch, and setting target patches in the image corresponding to the reference patch, the reference patch having a center pixel;
determining a similarity within the reference patch between the center pixel in the reference patch and nearby pixels in the reference patch;
adaptively setting a kernel based on the similarity within the reference patch;
determining a similarity between the reference patch and the target patches using the kernel; and
removing noise from the center pixel in the reference patch based on pixel values of center pixels in the target patches by applying, a weight to the center pixels of the target patches based on the similarity between the reference patch and the target patches.

2. The method of claim 1, wherein the kernel is adaptively changed according to a distribution of pixel values of the reference patch.

3. The method of claim 1, wherein the kernel gives a relatively high weight to a pixel value of the center pixel in the reference patch, if a similarity between the center pixel in the reference patch and the nearby pixels is high.

4. The method of claim 1, wherein the kernel is generated based on difference values between the center pixel in the reference patch and the nearby pixels in the reference patch that are close to the center pixel and a maximum one of the difference values and a minimum one of the difference values.

5. The method of claim 4, wherein the kernel is generated by normalizing the difference values between the center pixel in the reference patch and the nearby pixels using the maximum value and the minimum value.

6. The method of claim 4, wherein the kernel is generated based on location differences from the center pixel in the reference patch to the nearby pixels.

7. The method of claim 1, wherein the determining the similarity between the reference patch and the target patches further comprises:
calculating a difference between pixels in the reference patch and pixels in the target patch that corresponds to the pixels in the reference patch.

8. The method of claim 1, wherein the setting sets the target patches in images adjacent in an image sequence to the image.

9. A non-transitory computer-readable storage medium having stored thereon a computer program, which when executed by a computer, configures the computer to perform the method of claim 1.

10. An image processing apparatus configured to reduce noise in an image, the image processing apparatus comprising:
a processor configured to,
set a plurality of pixels in the image as a reference patch, and to set target patches in the image corresponding to the reference patch, the reference patch having a center pixel,
determine a similarity within the reference patch between the center pixel in the reference patch and nearby pixels in the reference patch,
adaptively set a kernel based on the similarity within the reference patch,
determine a similarity between the reference patch and the target patches using the kernel, and
remove noise from the center pixel in the reference patch based on pixel values of center pixels in the target patches by applying a weight to the center pixels of the target patches based on the similarity between the reference patch and the target patches.

11. The image processing apparatus of claim 10, wherein the processor is configured to adaptively change the kernel according to a distribution of pixel values of the reference patch.

12. The image processing apparatus of claim 10, wherein the kernel gives a relatively high weight to a pixel value of the center pixel in the reference patch if a similarity between the center pixel in the reference patch and the nearby pixels is high.

13. The image processing apparatus of claim 10, wherein the processor is configured to generate the kernel based on difference values between the center pixel in the reference patch and the nearby pixels in the reference patch that are close to the center pixel and a maximum one of the difference values and a minimum one of the difference values.

14. The image processing apparatus of claim 13, the processor is configured to generate the kernel by normalizing the difference values between the center pixel in the reference patch and the nearby pixels using the maximum value and the minimum value.

15. The image processing apparatus of claim 13, wherein the processor is configured to generate the kernel based on location differences from the center pixel in the reference patch to the nearby pixels.

16. The image processing apparatus of claim 10, wherein the processor is configured to further calculate a difference between pixels in the reference patch and pixels in the target patch that corresponds to the pixels in the reference patch.

17. The image processing apparatus of claim 10, wherein the processor is configured to further set the target patches in images adjacent in an image sequence to the image.

18. The image processing apparatus of claim 10, wherein the image is a depth image representing a distance between an image photographing apparatus and a subject.

* * * * *